Nov. 29, 1927.
E. A. BELL
1,651,246
GREASE TRAP
Filed July 23, 1924
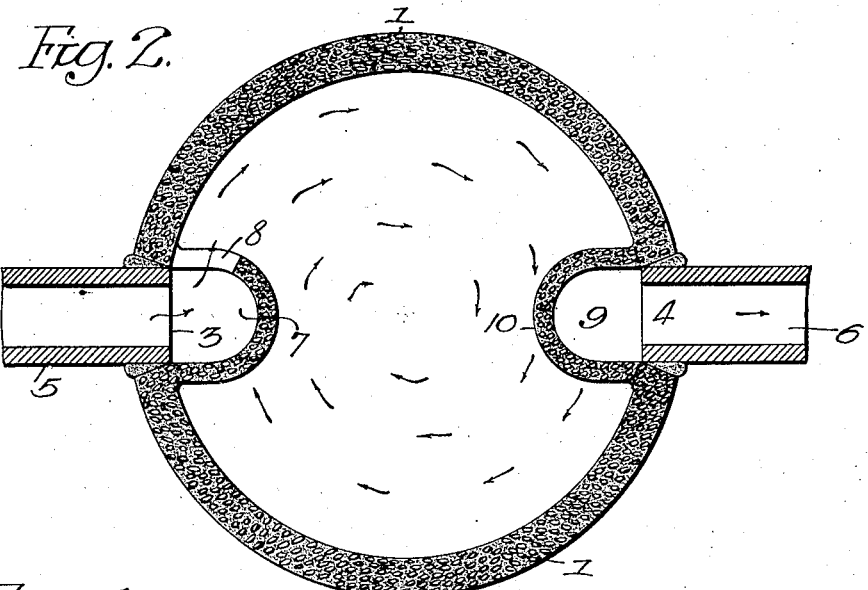
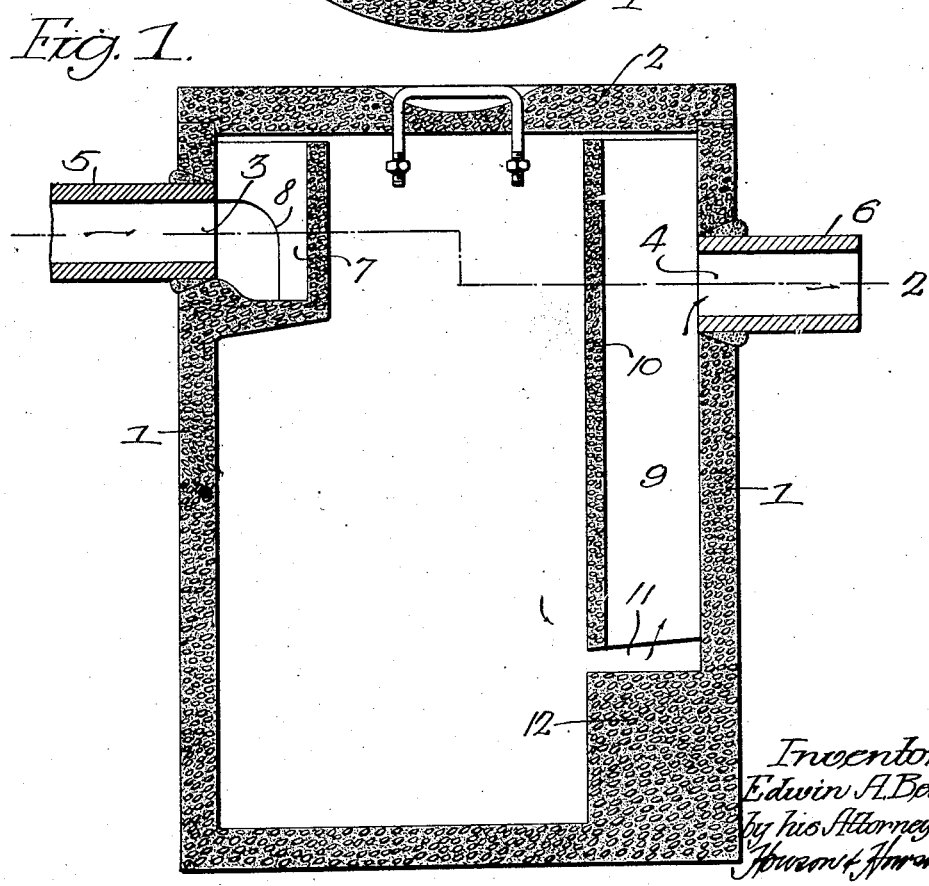
Inventor
Edwin A. Bell
by his Attorneys Patented Nov. 29, 1927.

1,651,246

UNITED STATES PATENT OFFICE.

EDWIN A. BELL, OF PHILADELPHIA, PENNSYLVANIA.

GREASE TRAP.

Application filed July 23, 1924. Serial No. 727,820.

The object of this invention is to provide a grease trap or interceptor which by reason of novel construction and mode of operation possesses an extremely high efficiency.

A subsidiary object of the invention is to provide means whereby the intercepted grease is automatically separated from the heavier sediment and foreign matters which may find their way into the trap.

The invention further provides for the subsequent recovery of the said sediment in order to obtain therefrom any articles of value which through accident have found their way into the drain line, and for interception of such solid matter and sediment as may be undesirable to pass into the drainage system.

A further object of the invention is to provide means whereby the intercepted grease is accumulated in the top of the trap in the form of a mat partially separated from the sides of the tank and capable of being dipped out.

The invention contemplates in its operation the use of a whirlpool principle and its associated centrifugal action tending to maintain the lighter constituents of the draining liquid including the grease at the center and top of the trap and forcing the water and heavier elements toward the outside. This action gives rise to the formation of a mat at the top of the whirling liquid consisting of the lighter elements and including the grease. Driven outwardly toward the periphery of the whirlpool, the heavier sediment and extraneous matter is adapted to accumulate in the bottom of the trap to be thereafter collected and examined for possible valuable articles accidentally finding their way into the drain. Accumulation of the grease in the form of a mat at the top of the trap and of the sediment in the bottom of the trap leaves the comparatively pure water free to be carried off through normal drain outlets provided for that purpose.

A grease trap made in accordance with the principle hereinbefore set forth is illustrated in the accompanying drawings, in which:

Figure 1 is a vertical section of a trap made in accordance with my invention, and Fig. 2 is a section on the line 2—2, Fig. 1.

As illustrated in the drawings, the trap in its preferred form may comprise a cylindrical container 1 provided with a detachable cover 2, and having in its sides an inlet port 3 and an outlet 4 preferably somewhat lower than the intake. In these ports are secured ducts or pipes 5 and 6 respectively, which constitute a part of the drainage system to which the trap may be applied. As clearly illustrated, the intake port 3, located near the top of the container, opens into a cylindrical well 7, having at one side and contiguous to the wall of the container an opening or port 8. The curved wall of the well 7 constitutes a deflector for the liquid entering through the pipe 5 and the port 3, and effects a discharge of the liquid through the port 8 in a direction substantially tangential to the inner cylindrical surface of the container, as indicated by the arrows in Fig. 2. It will be apparent that by this means the liquid in the interior of the trap is given a rotary motion in the nature of a whirlpool, with the result, aforedescribed, that the grease and lighter substances are automatically accumulated in a mat in the center of the container. Under these circumstances, the water and the heavier sediment or particles naturally seek a place near the wall of the container, the sediment dropping and accumulating in the bottom of the container, and the water comparatively free of grease and foreign matter passing to the discharge port 4 through a vertical shaft or chamber 9 formed by a partition 10 extending around and downwardly from the port 4, as clearly illustrated, admission to this discharge chamber 9 being afforded the water by a port 11 formed in the present instance by stopping the partition 10 short of a built-up section 12 in the bottom of the container.

By reason of this arrangement of inlet and outlet ports, the hot grease-carrying water entering the trap and given the circular motion, as aforedescribed, will have an opportunity before reaching the port 11 at the bottom to cool and to deposit its mat of grease at the center and near the top of the tank, thereby insuring a high efficiency in the grease extraction and preventing any material portion of the grease being carried through the outlets 11 and 4 with the water.

When the grease mat has reached a given size, it may be removed from the trap by removing the cover 2 and merely dipping out the grease which will be found in the top of the container, the operation leaving no portions adhering to the sides or walls of the container. After the mat has been removed, the sediment may be collected from the bottom of the container and examined for any articles that it may be desired to preserve. Replacement of the cover 2 places the device in condition for further operation.

The device will be found useful in house drainage lines preventing the fouling of the soil pipes, and is particularly useful in rural sewage systems employing septic tanks and the like, since grease tends to cut down the bacterial action in the tank, and removal of the grease therefore being of considerable advantage.

The device is also of particular value for the interception of grease from hotels, restaurants, garages, creameries, abattoirs and dental laboratories, in which latter case the device recommends itself as providing for the interception of minute particles of precious metal which may be recovered with the sediment accumulating in the bottom of the container. The trap also operates well in seashore drainage for intercepting sand entering the drains.

It will be understood that the device is capable of considerable modification without departure from the essential features of the invention as defined in the appended claims.

I claim:

1. A grease trap comprising a cylindrical container having inlet and outlet openings formed in the upper portion of its side wall, the outlet opening being disposed below said inlet opening, a deflector formed interiorly of the container and enclosing said inlet opening, said deflector being closed at the bottom, a discharge opening formed in the side of said deflector adjacent to the wall of said containers, a vertically disposed partition surrounding said outlet opening, said partition extending downwardly and terminating at a distance above the bottom of the container, and a raised section formed in the bottom of the container beneath the said partition and said raised section terminating below the lower edge of said partition to provide a restricted passage thereinto.

2. A grease trap comprising a cylindrical container having an inlet and an outlet formed in its side wall, the outlet being disposed below the said inlet, a cylindrical well formed around the inlet opening on the interior of the container, said well being provided at one side and contiguous to the wall of the container with a lateral opening whereby liquid will flow through the inlet in a direction substantially tangential to the inner cylindrical wall of the container, a vertically disposed partition formed around the said outlet opening, said partition providing an enclosed passage extending downwardly in the container and terminating at a distance above the bottom thereof, and a raised portion formed in the bottom of the container below said partition, said raised portion terminating below the bottom of the said partition to provide a restricted opening therebetween.

EDWIN A. BELL.